(12) United States Patent
Samuels

(10) Patent No.: US 6,959,918 B1
(45) Date of Patent: Nov. 1, 2005

(54) TRUCK CANOPY LIFTING ASSEMBLY

(76) Inventor: Jeffrey L. Samuels, 1155 Huckleberry La., Oak Harbor, WA (US) 98277

( * ) Notice: Subject to any disclaimer, the term of this patent is extended or adjusted under 35 U.S.C. 154(b) by 0 days.

(21) Appl. No.: 10/755,455

(22) Filed: Jan. 13, 2004

(51) Int. Cl.⁷ .............................................. B66D 1/36
(52) U.S. Cl. ...................... 254/338; 248/327; 414/626; 294/74
(58) Field of Search ........................ 254/338, 334–336; 248/327, 323; 150/166, 168; 383/22, 97, 383/67; 296/136; 160/370.2; 414/626; 294/74; 410/103

(56) References Cited

U.S. PATENT DOCUMENTS

| | | | |
|---|---|---|---|
| D258,054 S | | 1/1981 | Ellis |
| 4,600,177 A | * | 7/1986 | Fritz .......................... 254/338 |
| 5,051,027 A | * | 9/1991 | Horton .......................... 405/3 |
| 5,263,687 A | | 11/1993 | Garbiso |
| 5,320,394 A | * | 6/1994 | Urbank ......................... 294/74 |
| 5,897,104 A | * | 4/1999 | Garbiso ....................... 254/334 |
| 5,984,275 A | * | 11/1999 | Hoslett ....................... 254/338 |
| 6,017,018 A | | 1/2000 | Langdon |
| 6,056,274 A | * | 5/2000 | Naas et al. .................. 254/335 |
| 6,152,427 A | * | 11/2000 | Hoslett ....................... 254/338 |
| 6,361,022 B1 | * | 3/2002 | Lob et al. .................... 254/338 |

* cited by examiner

*Primary Examiner*—Emmanuel M Marcelo

(57) ABSTRACT

A truck cap lifting assembly includes a first elongated member and a second elongated member each having a first end, a second end, a top side, a bottom side, and a pair of lateral side edges. A lifting assembly is attached to each of the first and second elongated members such that the first and second elongated members may be selectively lifted or lowered. The lifting assembly supports the first and second elongated members such that the elongated members are spaced from each other and are orientated parallel to each other. Wherein a truck cap may be positioned on the elongated members and selectively raised or lowered by the lifting assembly.

6 Claims, 4 Drawing Sheets

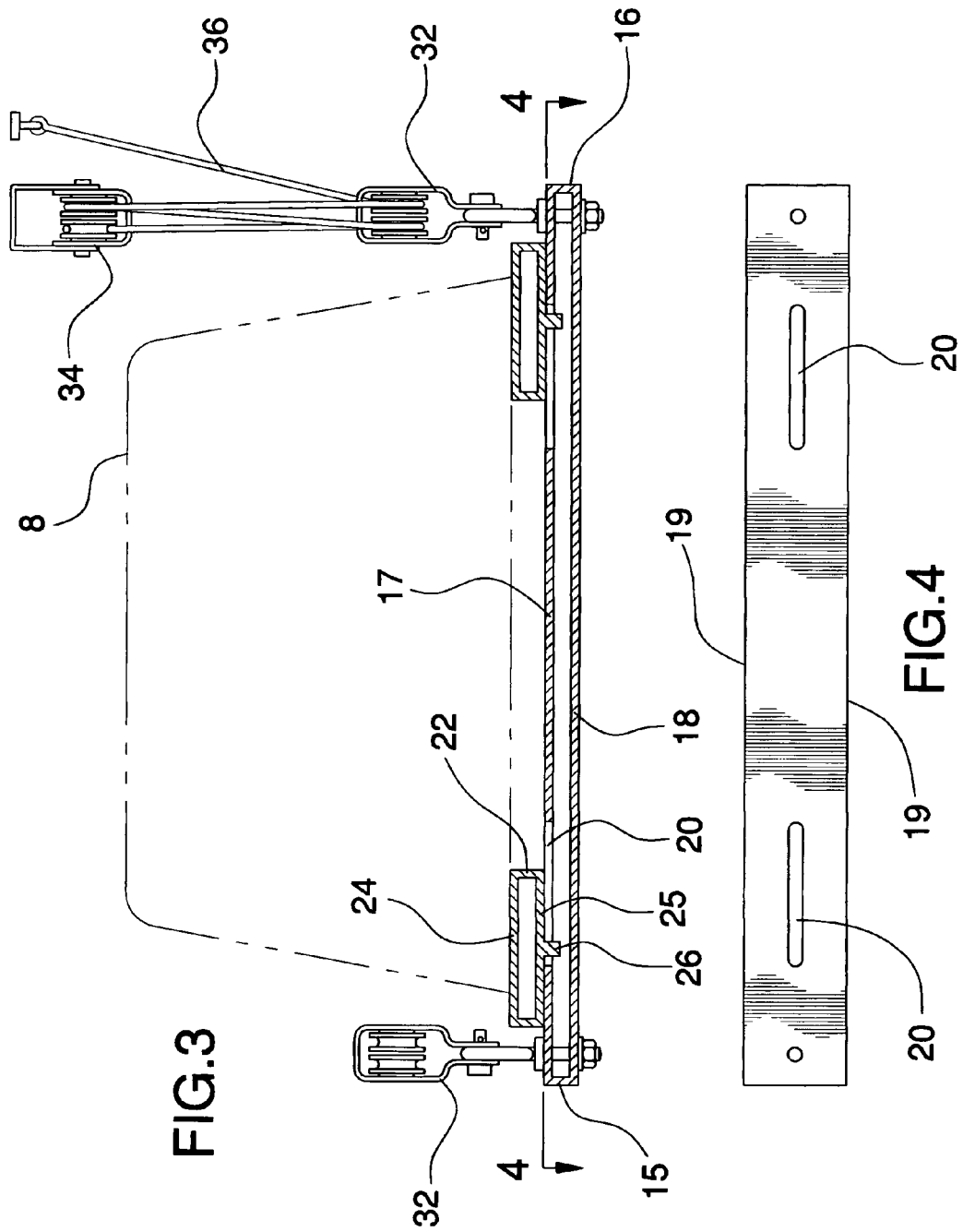

TRUCK CANOPY LIFTING ASSEMBLY

BACKGROUND OF THE INVENTION

1. Field of the Invention

The present invention relates to truck cap lifting devices and more particularly pertains to a new truck cap lifting device for selectively lifting and lowering pick-up truck cap.

2. Description of the Prior Art

The use of truck cap lifting devices is known in the prior art. While these devices fulfill their respective, particular objectives and requirements, the need remains for a device that is more stable and previous designs while also allowing varying sizes of truck caps.

SUMMARY OF THE INVENTION

The present invention meets the needs presented above by including elongated members which are held by a lifting assembly. A truck cap may be positioned on the elongated members and then lifted or lowered by the lifting assembly.

Another object of the present invention is to provide a new cap lifting device that includes support panels which are selectively adjustable for accommodating variously sized truck caps. The support panels are positioned on the elongated members and have a greater width than the elongated member for providing greater stability for the truck cap.

To this end, the present invention generally comprises a first elongated member and a second elongated member each having a first end, a second end, a top side, a bottom side, and a pair of lateral side edges. A lifting assembly is attached to each of the first and second elongated members such that the first and second elongated members may be selectively lifted or lowered. The lifting assembly supports the first and second elongated members such that the elongated members are spaced from each other and are orientated parallel to each other. Wherein a truck cap may be positioned on the elongated members and selectively raised or lowered by the lifting assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross-sectional view of an elongated member of the present invention.

FIG. 4 is a schematic top view of an elongated member of the present invention.

DESCRIPTION OF THE PREFERRED EMBODIMENT

Figure 1:
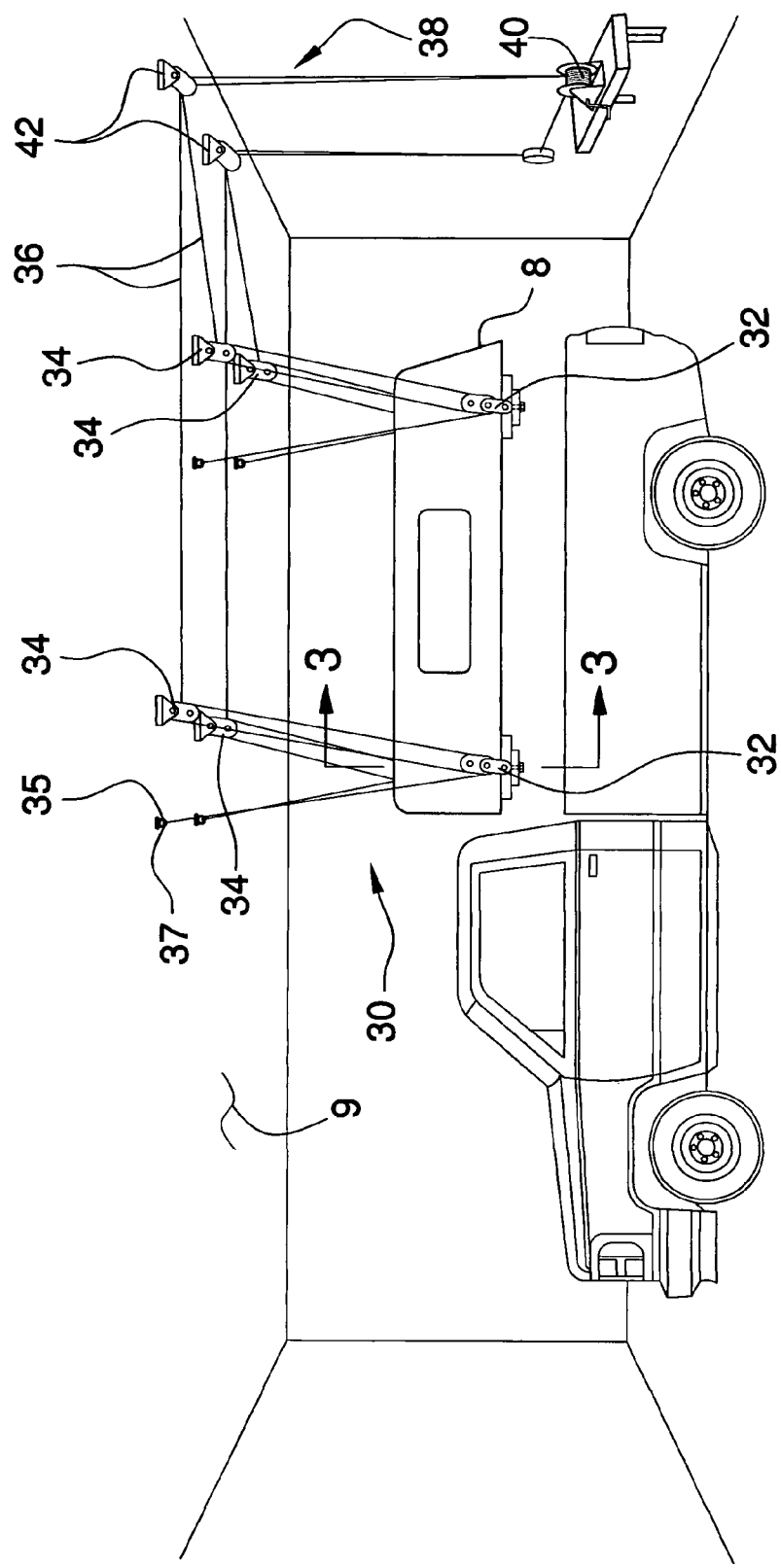
FIG. 1 is a schematic side perspective view of a truck cap lifting assembly according to the present invention.
Figure 2:
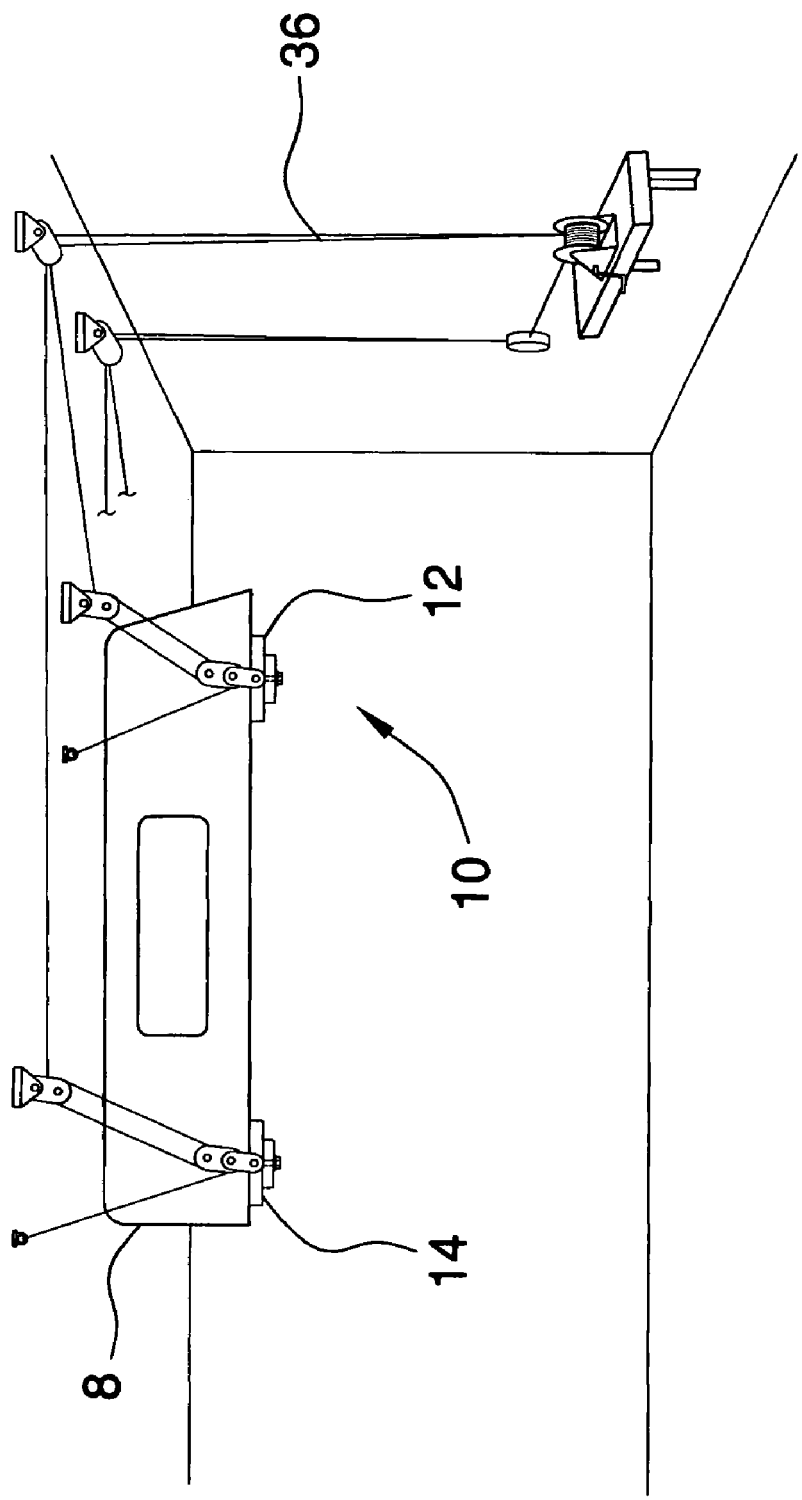
FIG. 2 is a schematic side perspective view of the present invention.
Figure 5:
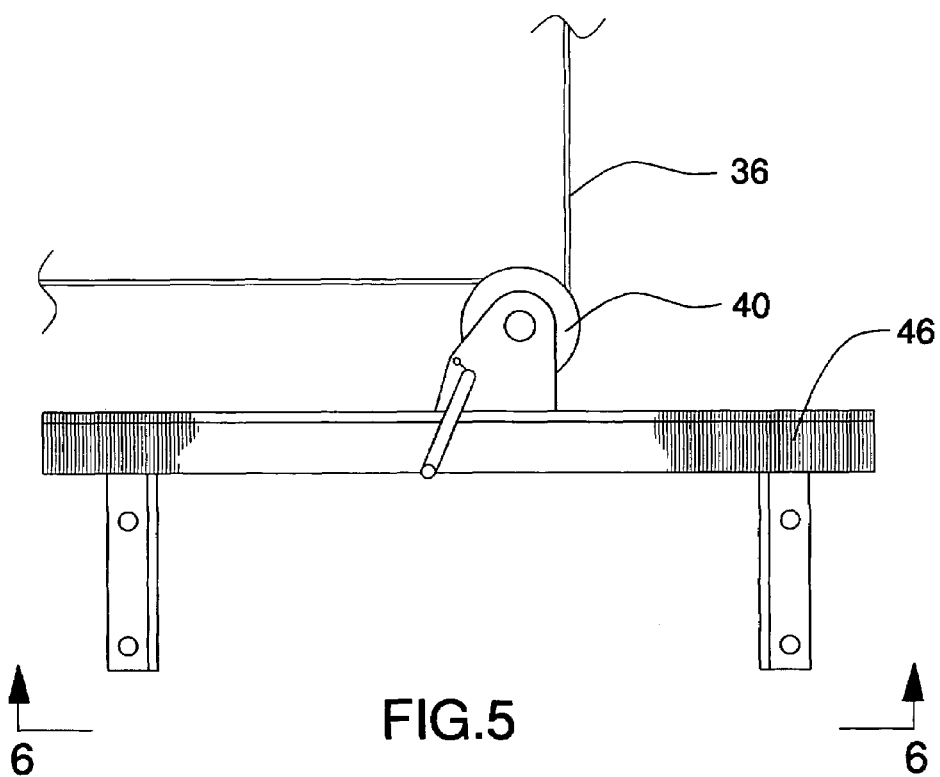
FIG. 5 is a schematic front view a winch of the present invention.
Figure 6:
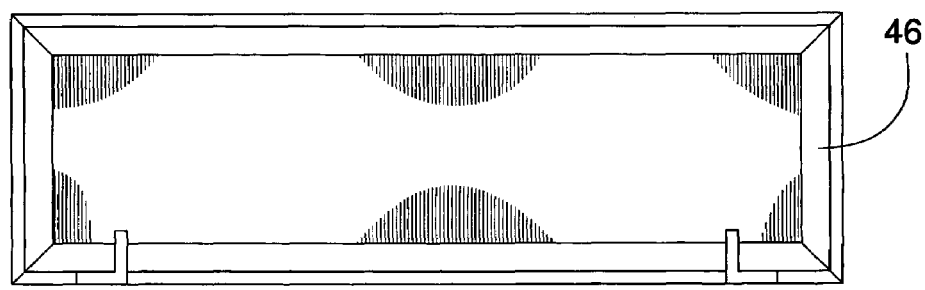
FIG. 6 is a schematic bottom view a winch mounting of the present invention.

With reference now to the drawings, and in particular to FIGS. 1 through 6 thereof, a new truck cap lifting device embodying the principles and concepts of the present invention and generally designated by the reference numeral 10 will be described.

As best illustrated in FIGS. 1 through 6, the truck cap lifting assembly 10 generally comprises a first elongated member 12 and a second elongated member 14 each having a first end 15, a second end 16, a top side 17, a bottom side 18, and a pair of lateral side edges 19. The top sides 17 each have a pair of elongated slots 20 therein. The slots 20 in each of the first 12 and second 14 elongated members are spaced from each other and each of the slots 20 extends along a longitudinal axis of the first 12 and second 14 elongated members. Each of the slots 20 is positioned adjacent to one of the first 15 and second 16 ends.

A plurality of support panels 22 is provided. Each of the support panels 22 has an upper surface 24 and a lower surface 25. Each of a plurality of securing members 26 secures each of the lower surfaces 25 to one of the top sides 17 such that each of the elongated members 12, 14 has two panels 22 attached thereto. Each of the panels 22 has a width greater than a width of the elongated members 12, 14 such that each of panels 22 extends beyond each of the lateral sides 19 of an attached one of elongated members 12, 14. The securing members 26 each include a post attached to one of the lower surfaces 25 and extending into one of the slots 20. The posts, or securing members 25, are selectively positionable along a length of an associated one of the slots 20 so that the panels 22 may be positioned depending upon a width of the truck cap 8.

A lifting assembly 30 is attached to each of the first 12 and second 14 elongated members such that the first 12 and second 14 elongated members may be selectively lifted or lowered. The lifting assembly 30 supports each of the first 12 and second 14 elongated members such that the elongated members 12, 14 are spaced from each other and are orientated parallel to each other. The lifting assembly 30 includes four first pulleys 32. Two of the first pulleys 32 are attached to each one of the first 12 and second 14 elongated members and is positioned adjacent to one of the first 15 and second 16 ends. Each of the first pulleys 32 has a rotational axis orientated substantially parallel to the longitudinal axis of the first 12 and second 14 elongated members. Each of four second pulleys 34 is attached to a ceiling surface 9, such as in a garage. The second pulleys 34 are spaced from each other and generally configured in a rectangular shape or pattern upon the ceiling 9 such that each of second pulleys 34 is generally aligned within one of the first 15 and second 16 ends of the elongated members 12, 14. A rotational axis of each of the second pulleys 34 is orientated substantially parallel to the rotational axis of the first pulleys 32. A plurality of cables 36 couple the each of the first pulleys 32 to one of the second 34 pulleys.

A winch assembly 38 is attached to each of the cables 36 for selectively winding or unwinding each of the cables 36. The elongated members 12, 14 are lifted upwardly when the cables 36 are wound and lowered when the cables 36 are unwound. The winch assembly 38 may include a winch 40 and a pair of third pulleys 42 attached to the ceiling 9 and positioned generally adjacent to the winch 40. Each of the cables 36 includes a first end 37 attached to a fastener 35 on the ceiling 9 and extends through one each of the first 32, second 34 and third 42 pulleys and is then attached to the winch 40. FIG. 3 depicts one method of winding a cable 36 around the first 32 and second 34 pulleys. It is preferred that each of the first 32, second 34 and third 42 pulleys are double block pulleys each having two pulley wheels therein. The winch 40 is preferably mounted on a mounting 46 and positioned at a level that is easily accessible by a user of the assembly 10. The winch 40 may be a manually or electrically powered winch.

In use, the elongated members 12, 14 are lowered to a position so that the cap 8 of a pickup truck may be slid onto the support panels 22 as shown in FIG. 1. The support panels 22 may be moved depending on the size of truck cap 8. The winch 40 is used to wind the cables 36 to lift the elongated members 12, 14 upwardly and the truck cap 8 therewith. The winch 40 may include a locking member for selectively preventing the rotation of the winch.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A truck cap lifting and storage assembly comprising:
   a first elongated member and a second elongated member each having a first end, a second end, a top side, a bottom side, and a pair of lateral side edges;
   a plurality of support panels each having an upper surface and a lower surface;
   a plurality of securing members, each of said securing members securing each of said lower surfaces to one of said top sides such that each of said elongated members has two panels attached thereto, each of said panels having a width greater than a width of said elongated members such that each of panels extends beyond each of said lateral sides of an attached one or elongated members;
   a lifting assembly being attached to each of said first and second elongated members such that said first and second elongated members may be selectively lifted or lowered, said lifting assembly supporting said first and second elongated members such that said elongated members are spaced from each other and are orientated parallel to each other; and
   wherein the truck cap may be positioned on said elongated members and selectively raised or lowered by said lifting assembly.

2. The assembly according to claim 1, wherein each of said first and second elongated members has a pair of elongated slots therein, said slots being spaced from each other and each of said slots extending along a longitudinal axis of said first and second elongated members, each of said slots being positioned adjacent to one of said first and second ends, each of said securing members including a post attached to one of said lower surfaces and extending into said slot, wherein said posts are selectively positionable along a length of an associated one of said slots.

3. The assembly according to claim 1, wherein said lifting assembly further includes:
   four first pulleys, two of said first pulleys being attached to each one of said first and second elongated members and being positioned adjacent to one of said first and second ends, each of said first pulleys having a rotational axis orientated substantially parallel to said longitudinal axis of said first and second elongated members;
   four second pulleys, each of said second pulleys being attached to a ceiling surface, said second pulleys being spaced from each other and generally configured in a rectangular shape, a rotational axis of each of said second pulleys being orientated substantially parallel to said rotational axis of said first pulleys;
   a plurality of cables coupling said each of said first pulleys to one of said second pulleys;
   a winch assembly being attached to each of said cables for selectively winding or unwinding each of said cables, wherein said elongated members are lifted upwardly when said cables are wound and lowered when said cables are unwound.

4. The assembly according to claim 1, wherein said lifting assembly further includes:
   four first pulleys, two of said first pulleys being attached to one of said first and second elongated members and being positioned adjacent to one of said first and second ends, each of said first pulleys having a rotational axis orientated substantially parallel to said longitudinal axis of said first and second elongated members;
   four second pulleys, each of said second pulleys being attached to a ceiling surface, said second pulleys being spaced from each other and generally configured in a rectangular shape, a rotational axis of each of said second pulleys being orientated substantially parallel to said rotational axis of said first pulleys;
   a plurality of cables coupling said each of said first pulleys to one of said second pulleys;
   a winch assembly being attached to each of said cables for selectively winding or unwinding each of said cables, wherein said elongated members are lifted upwardly when said cables are wound and lowered when said cables are unwound.

5. A truck cap lifting and storage assembly comprising:
   a first elongated member and a second elongated member each having;
      a first end, a second end, a top side, a bottom side, and a pair of lateral side edges, said top side having a pair of elongated slots therein, said slots being spaced from each other and each of said slots extending along a longitudinal axis of said first and second elongated members, each of said slots being positioned adjacent to one of said first and second ends;
   a plurality of support panels each having an upper surface and a lower surface;
   a plurality of securing members, each of said securing members securing each of said lower surfaces to one of said top sides such that each of said elongated members has two panels attached thereto, each of said panels having a width greater than a width of said elongated members such that each of panels extends beyond each of said lateral sides of an attached one of elongated members, each of said securing members including a post attached to one of said lower surfaces and extending into said slot, wherein said posts are selectively positionable along a length of an associated one of said slots;

a lifting assembly being attached to each of said first and second elongated members such that said first and second elongated members may be selectively lifted or lowered, said lifting assembly supporting each of said first and second elongated members such that said elongated members are spaced from each other and are oriented parallel to each other, said lifting assembly including;

four first pulleys, two of said first pulleys being attached to each one of said first and second elongated members and being positioned adjacent to one of said first and second ends, each of said first pulleys having a rotational axis orientated substantially parallel to said longitudinal axis of said first and second elongated members;

four second pulleys, each of said second pulleys being attached to a ceiling surface, said second pulleys being spaced from each other and generally configured in a rectangular shape, a rotational axis of each of said second pulleys being oriented substantially parallel to said rotational axis of said first pulleys;

a plurality of cables coupling said each of said first pulleys to one of said second pulleys;

a winch assembly being attached to each of said cables for selectively winding or unwinding each of said cables, wherein said elongated members are lifted upwardly when said cables are wound and lowered when said cables are unwound; and wherein the truck cap may be positioned on said elongated members and selectively raised or lowered by said lifting assembly.

6. A truck cap lifting and storage assembly comprising:

a first elongated member and a second elongated member each having a first end, a second end, a top side, a bottom side, and a pair of lateral side edges;

a lifting assembly being attached to each of said first and second elongated members such that said first and second elongated members may be selectively lifted or lowered, said lifting assembly supporting said first and second elongated members such that said elongated members are spaced from each other and are orientated parallel to each other, said lifting assembly including;

four first pulleys, two of said first pulleys being attached to one of said first and second elongated members and being positioned adjacent to one of said first and second ends, each of said first pulleys having a rotational axis orientated substantially parallel to said longitudinal axis of said first and second elongated members;

four second pulleys, each of said second pulleys being attached to a ceiling surface, said second pulleys being, spaced from each other and generally configured in a rectangular shape, a rotational axis of each of said second pulleys being orientated substantially parallel to said rotational axis of said first pulleys;

a plurality of cables coupling said each of said first pulleys to one of said second pulleys;

a winch assembly being attached to each of said cables for selectively winding or unwinding each of said cables, wherein said elongated members are lifted upwardly when said cables are wound and lowered when said cables are unwound; and wherein the truck cap may be positioned on said elongated members and selectively raised or lowered by said lifting assembly.

* * * * *